WIDE BAND IMPEDANCE MATCHING NETWORK

Filed Oct. 23, 1946

INVENTOR.
Israel J. Melman
BY H. G. Grover
ATTORNEY

Patented Dec. 5, 1950 2,533,030

UNITED STATES PATENT OFFICE 2,533,030

WIDE BAND IMPEDANCE MATCHING NETWORK

Israel J. Melman, Jamaica, N. Y., assignor to Radio Corporation of America, a corporation of Delaware Application October 23, 1946, Serial No. 705,005

11 Claims. (Cl. 178—44)

The present invention relates to impedance matching networks adapted to be inserted between a transmission line and an antenna and is particularly adapted to, but not limited to, transmitting arrangements for radio navigation systems. In the design and operation of transmitters for long distance radio navigation systems, it is important that the stations of a pair of transmitters transmit pulses which are as nearly identical as possible. The radio frequency pulses transmitted are shaped progressively by several successive factors, not the least important of which are the antenna and its line matching circuits. The pulse shaping contributed by the antenna and associated circuits occurs regardless of the type of the transmitter used. The tendency of the antenna circuits to modify the pulse shape depends upon its selectivity in relationship to the pulse band width. For example, a 625 ft. umbrella tower may be expected to have a Q of approximately 12. When matched to its transmission line, such an antenna will have a band width of approximately 30 kilocycles between 70% response points. The band width of such an antenna would be ample to assure that any shaping contributed by the antenna would be a second order effect. However, any shortcomings in the circuits which match the antenna to its transmission line would be likely to so narrow the band width as to cause some shaping to take place. The more commonly known matching circuits present an impedance to the line which varies over the frequency range which must be covered, either in magnitude or phase angle, or both. Thus, the degree of shaping contributed by the matching circuit is a function of transmission line length. Therefore, where the transmission line lengths cannot be the same for both of a pair of Loran transmitters, the resultant received pulses from the two transmitters will be different.

An object, therefore, of the present invention is the provision of a matching circuit for matching a transmission line to an antenna which will not adversely effect the transmitted pulse shape from a Loran transmitter.

Another object of the present invention is the provision of a matching circuit for matching a low Q antenna to a low impedance transmission line over a wide band of frequencies.

A further object of the present invention is the provision of auxiliary circuits in an impedance matching arrangement for flattening the response characteristic of a low frequency antenna system over a wide band of frequencies.

Still a further object of the present invention is the provision of a method of broadening the response characteristic of an impedance matching network.

The foregoing objects and others which may appear from the following detailed description are attained by adding compensating network elements to a more or less conventional impedance matching system between a transmission line and an antenna. These networks are so arranged as to fill in the valleys and flatten off the hills in the response characteristic of the system whereby a broad band of operation is obtained.

The present invention will be more fully understood by reference to the following detailed description which is accompanied by a drawing in which:

Figure 4 is a circuit arrangement showing an antenna to line matching unit utilizing the principles of the present invention, while

Figure 1:
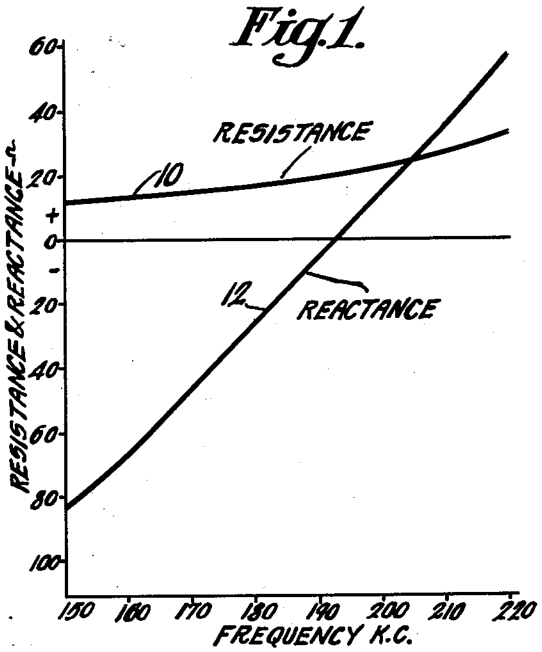
Figure 1 is a family of curves illustrating the resistance and reactance characteristics of an antenna with which the present impedance matching arrangement is adapted to be used.

The impedance matching system of the present invention was particularly adapted to be used with an antenna having the impedance characteristics shown in Figure 1 wherein curve 10 shows the resistance characteristics over a band of frequencies ranging from 150 kc. to 220 kc. while curve 12 illustrates the reactance characteristics. A match to a 50 ohm transmission line is readily obtained for such an antenna at any single frequency. However, heretofore known networks present an impedance to the line which varies over the desired frequency range either in magnitude or phase angle, or both. Thus, the impedance matching network in Figure 2 which includes a series arrangement of inductors 20 and 22 and a capacitor 21 between the line and the antenna with a shunt capacitor 24 connected from point *a* to ground has a comparatively narrow band response such as shown in Figure 3.

Here it will be noted that the resistance characteristic indicated by curve 26 has a value of approximately 20 ohms at about 171 kc. rising to a value of over 60 ohms at 180 kc. Thereafter the resistance drops again to a value slightly over 20 ohms. At the same time the reactance characteristics, shown by curve 28, varies from a negative value of reactance of 30 ohms at 171 kc., passing through zero at 176, 180 and 184 kc., and finally terminates in a positive value of 30 ohms at 188 kc.

Figure 2:
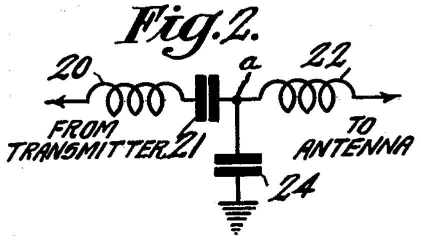
Figure 2 illustrates an antenna to line matching unit without the improvements which constitute the present invention.
Figure 3:
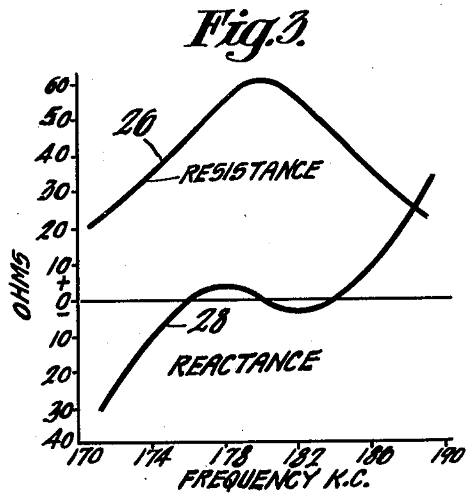
Figure 3 is a family of curves illustrating the resistance and reactance characteristics of the matching unit of Figure 2 when terminated by the antenna.
Figure 4:
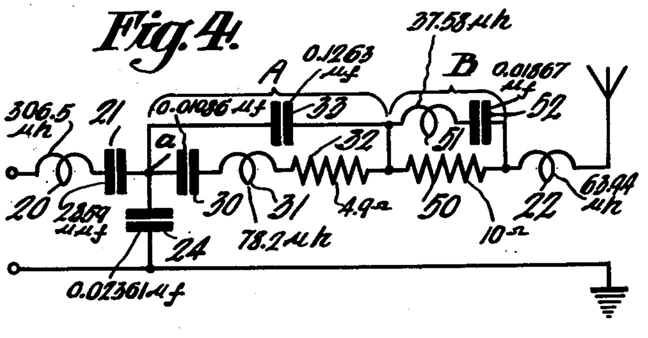

Now, if the impedance matching network of Figure 2 is modified as shown in Figure 4 by the insertion of the series networks A and B, the irregularities of the response curve can be straightened out as will be now explained. The network of Figure 2 may be considered to consist of two reactive arms connected in shunt to one another between points $a$ and ground. One arm includes condenser 24 while the other includes reactance 22 and the reactance and resistance of the antenna in series therewith. The impedance of the network may be expressed by the following relationship:

$$Z=\frac{RX_c^2}{R^2+(X-X_c)^2}+j\frac{(X_c^2X-X_cX^2-R^2X_c)}{R^2+(X-X_c)^2}$$

where $X_c$ is the reactance of shunt condenser 24, X is the reactance of the antenna plus the reactance of inductance 22 and R is the resistance of the antenna.

Figures 5, 6:
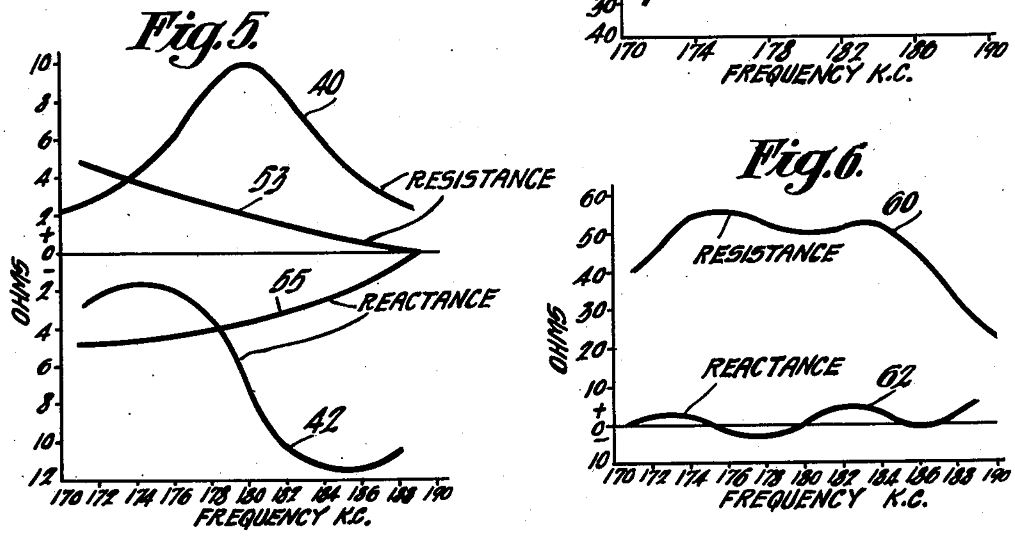
Figure 5 illustrates the impedance characteristics of the added networks of Figure 4 over Figure 2.
Figure 6 is a family of curves illustrating the impedance characteristics of the matching unit of Figure 4.

The point of maximum resistance at 180 kc. is the point at which $X=X_c=0$. If, for this frequency, the $R^2$ term in the denominator could be made to go through a maximum the resultant curve would be flattened out. In other words, the R term should be so arranged as to vary as the inverse of the difference in reactance between the two short arms of the network. The desired variation in $R^2$ may be attained by adding in series with the antenna the network A of Figure 4. Network A consisting of a series connected arrangement of capacitor 30, inductance 31 and resistance 32 shunted by a further capacitor 33 has a resistance characteristic as shown by curve 40 of Figure 5. It has a reactance characteristic as shown by curve 42 of Figure 5. The addition of this circuit to the matching circuit of Figure 2 effecting the circuit shown in Fig. 4 results in broad topped impedance curve such as that shown by curve 60 in Figure 6. The slight droop of the curve at the high frequency end may be largely compensated for by the addition of network B (Figure 4). This network consists of a resistor 50 shunted by a series connected choke 51 and capacitor 52. It has a resistance characteristic as shown by curve 53 of Figure 5 and a reactance characteristic as shown by curve 55 of Figure 5.

Curve 62 (Figure 6) shows further that the reactance characteristic of the system is now low and substantially constant over the entire frequency band. Some power loss is encountered as a consequence of the use of the two added circuit elements A and B of Figure 4. However, the power loss is considered justified since it results in an increased transfer of energy to the antenna for the side bands near the edges of the pass band characteristic.

While I have illustrated a particular embodiment of the present invention, it should be clearly understood that it is not limited thereto since many modifications may be made in the several elements employed and in their arrangement without departing from the spirit and scope of the invention.

What is claimed is:

1. A circuit arrangement for coupling a transmission line to a load including a reactance network comprising a series arm and a shunt arm of reactive circuit elements for matching impedances of said line and said load over a band of frequencies and a further network interposed in series circuit arrangement with the first said network and said load and comprising a series connected capacitor, inductor and resistor shunted by a further capacitor, the components of said further network having values at which the resistance characteristic curve with a variation in frequency exhibits a slope inverse to that of the difference between the reactance curves of said shunt capacitor and of said load.

2. A circuit arrangement for coupling a transmission line to a load including a reactance network comprising a series arm and a shunt arm of reactive circuit elements for matching impedances of said line and said load over a band of frequencies and a further network connected in series between said transmission line and said load and comprising a series connected capacitor, inductor and resistor shunted by a further capacitor, the components of said further network having values at which the resistance characteristic curve with a variation in frequency exhibits a slope inverse to that of the difference between the reactance curves of said shunt capacitor and of said load.

3. A circuit arrangement for coupling a transmission line to an antenna including a reactance network comprising a series arm and a shunt arm of reactive circuit elements for matching impedances of said line and said antenna over a band of frequencies and a further network interposed in series circuit arrangement with the first said network and said antenna and comprising a series connected capacitor, inductor and resistor shunted by a further capacitor, the components of said further network having values at which the resistance characteristic curve with a variation in frequency exhibits a slope inverse to that of the difference between the reactance curves of said shunt capacitor and of said antenna.

4. A circuit arrangement for coupling a transmission line to an antenna including a reactance network comprising a series arm and a shunt arm of reactive circuit elements for matching the impedance of said line to that of said antenna over a band of frequencies and a further network interposed in series circuit arrangement with the first said network and said antenna and comprising a series connected capacitor, inductor and resistor shunted by a further capacitor, the components of said further network having values at which the resistance characteristic curve with a variation in frequency exhibits a slope inverse to that of the difference between the reactance curves of said shunt capacitor and of said antenna.

5. An arrangement for coupling a transmission line to a load over a wide frequency band, including a matching network comprising first and second reactive elements connected in series between one terminal of said transmission line and a terminal of said load, a third reactive element shunted between the junction of said first and second reactive elements and another terminal of said transmission line, the elements of said matching network having values at which a substantially pure resistive characteristic is obtained and said transmission line is substantially matched to said load within relatively narrow frequency limits at a desired frequency within said wide frequency band, a compensating network including a fourth reactive element interposed in series with said second reactive element between said junction point and said load and a series circuit comprising a fifth reactive element and a resistive element connected in series thereacross, the elements of said compensating network having values at which a substantially pure resistive characteristic is obtained and said transmission line is substantially matched to said load over relatively wide frequency limits within said wide frequency band.

6. An arrangement for coupling a transmission line to a load over a wide frequency band, including a matching network comprising first and second reactive elements connected in series between one terminal of said transmission line and a terminal of said load, a third reactive element shunted between the junction of said first and second reactive elements and another terminal of said transmission line, the elements of said matching network having values at which said transmission line is substantially matched to said load within relatively narrow frequency limits at a desired frequency within said wide frequency band, and a compensating network including a fourth reactive element interposed in series with said second reactive element between said junction point and said load and a series circuit comprising a fifth reactive element and a first resistive element connected in series thereacross, the elements of said compensating network having values at which the reactance characteristic of said matching network is substantially zero said transmission line is substantially matched to said load over relatively wide frequency limits within said wide frequency band.

7. An arrangement for coupling a transmission line to a load over a wide frequency band, including a matching network comprising first and second reactive elements connected in series between one terminal of said transmission line and a terminal of said load, a third reactive element shunted between the junction of said first and second reactive elements and another terminal of said transmission line, the elements of said matching network having values at which said transmission line is substantially matched to said load within relatively narrow frequency limits at a desired frequency within said wide frequency band, a compensating network including a fourth reactive element interposed in series with said second reactive element between said junction point and said load and a series circuit comprising a fifth reactive element and a first resistive element connected in series thereacross, the elements of said compensating network having values at which the reactance characteristics of said matching network are substantially zero and said transmission line is substantially matched to said load over the greater part of said wide frequency band, and a correcting network including a second resistive element interposed in series with said compensating network and said second reactive element between said junction point and said load, and a series circuit comprising a sixth reactive element shunted across said second resistive element, the elements of said correcting network having values at which the reactance characteristic of said matching and said compensating network is substantially zero and said transmission line is substantially matched to said load over substantially the entirety of said wide frequency band.

8. An arrangement for coupling a transmission line to a load over a wide frequency band, including a matching network comprising first and second reactive elements connected in series between one terminal of said transmission line and a terminal of said load, a third reactive element shunted between the junction of said first and second reactive elements and another terminal of said transmission line, the elements of said matching network having values at which said transmission line is substantially matched to said load within relatively narrow frequency limits at a desired frequency within said wide frequency band, a compensating network including a fourth reactive element interposed in series with said second reactive element between said junction point and said load and a series circuit comprising a fifth reactive element and a resistive element connected in series thereacross, the elements of said compensating network having values at which said transmission line is substantially matched to said load over relatively wide frequency limits within said wide frequency band.

9. An arrangement for coupling a transmission line to a load over a wide frequency band, including a matching network comprising first and second reactive elements connected in series between one terminal of said transmission line and a terminal of said load, a third reactive element shunted between the junction of said first and second reactive elements and another terminal of said transmission line, the elements of said matching network having values at which said transmission line is substantially matched to said load within relatively narrow frequency limits at a desired frequency within said wide frequency band, a compensating network including a fourth reactive element interposed in series with said second reactive element between said junction point and said load and a series circuit comprising a fifth reactive element and a first resistive element connected in series thereacross, the elements of said compensating network having values at which said transmission line is substantially matched to said load over the greater part of said wide frequency band, and a correcting network including a second resistive element interposed in series with said compensating network and said second reactive element between said junction point and said load, and a series circuit comprising a sixth reactive element shunted across said second resistive element, the elements of said correcting network having values at which said transmission line is substantially matched to said load over substantially the entirety of said wide frequency band.

10. An arrangement for coupling a transmision line to a load over a wide frequency band, including a matching network comprising a first inductor and a first capacitor connected in series between one terminal of said transmission line and a junction point, a second capacitor coupled between another terminal of said transmission line and said junction point, a second inductor connected between said junction point and a terminal of said load and a connection between another terminal of said load and said other terminal of said transmission line, said first and said second inductors and said first and said second capacitors having values at which said transmission line is substantially matched to said load between relatively narrow frequency limits at a desired frequency within said wide frequency band, a compensating network including a third capacitor interposed in series with said second inductor between said junction point and said load and a series circuit comprising a third inductor, a fourth capacitor and a first resistor connected in series across said third capacitor, said third and said fourth capacitors, said third inductor and said first resistor having values at which said transmission line is substantially matched to said load over wide frequency limits within said wide frequency band.

11. An arrangement for coupling a transmission line to a load over a wide frequency band, including a matching network comprising a first inductor and a first capacitor connected in series between one terminal of said transmission line and a junction point, a second capacitor coupled between another terminal of said transmission line and said junction point, a second inductor connected between said junction point and a terminal of said load and a connection between another terminal of said load and said other terminal of said transmission line, said first and said second inductors and said first and said second capacitors having values at which said transmission line is substantially matched to said load between relatively narrow frequency limits at a desired frequency within said wide frequency band, a compensating network including a third capacitor interposed in series with said second inductor between said junction point and said load and a series circuit comprising a third inductor, a fourth capacitor and a first resistor connected in series across said third capacitor, said third and said fourth capacitors, said third inductor and said first resistor having values at which said transmission line is substantially matched to said load over the greater part of said wide frequency bands, and a correcting network comprising a second resistor connected in series with said compensating network and said inductor between said junction point and said load, and a series circuit comprising a fourth inductor and a fifth capacitor shunted across said second resistor, said fourth inductor, said second resistor and said fifth capacitor having values at which said transmission line is substantially matched to said load over substantially the entirety of said wide frequency band.

ISRAEL J. MELMAN.

REFERENCES CITED

The following references are of record in the file of this patent:

UNITED STATES PATENTS

| Number | Name | Date |
|---|---|---|
| 2,048,737 | Farnham | July 28, 1936 |
| 2,111,743 | Blumlein | Mar. 22, 1938 |
| 2,315,170 | Van Weel | Mar. 30, 1943 |
| 2,390,839 | Klingaman | Dec. 11, 1945 |